B. M. KENT.

LOCKING DEVICE.

APPLICATION FILED JAN. 6, 1919.

Reissued May 24, 1921. 15,110.

Inventor:
B. M. Kent
by Clyde L. Rogers
his atty.

UNITED STATES PATENT OFFICE.

BURTON M. KENT, OF SAYRE, PENNSYLVANIA, ASSIGNOR OF ONE-HALF TO EDWARD M. RAGAN, OF BINGHAMTON, NEW YORK.

LOCKING DEVICE.

15,110. Specification of Reissued Letters Patent. Reissued May 24, 1921.

Original No. 1,211,451, dated January 9, 1917, Serial No. 42,369, filed July 28, 1915. Application for reissue filed January 6, 1919. Serial No. 269,880½.

*To all whom it may concern:*

Be it known that I, BURTON M. KENT, a citizen of the United States, and resident of Sayre, county of Bradford, State of Pennsylvania, have invented a new and useful Improvement in Locking Devices, of which the following is a specification.

The present invention is directed to improvements in locks, and more particularly to locks used in connection with grease cups.

In the present instance the lock is shown as used in connection with a grease cup, but it will be understood that the construction is such that it can be used for positively locking relatively movable parts of any kind.

A principal object of the invention is to provide a grease cup equipped with a locking device adapted to hold the grease cup plunger locked positively in any position to which it may be adjusted within the cup, such locking device being embodied in a form that is simple and inexpensive yet reliable in operation and capable of being most conveniently manipulated by the operator and without requiring the use of more than one hand in so doing. The present improved locking device permits the manipulation of the plunger either by hand or by a small wrench, since the need of the usual lock nut on the plunger is dispensed with and as soon as the spring dog or head of the locking device is disengaged from the plunger, the plunger is entirely free to be turned for its threaded adjustment within the cup. To this end I provide the threaded plunger that is fitted within the cup, with one or more longitudinal slots and mount a spring dog or head on the cup to coöperate with such slot, said spring dog having a finger piece permitting it to be conveniently pressed into disengaging position with a slight effort of the operator, said locking dog for this purpose being preferably mounted on the side wall of the cup. A further object is to provide a locking device of this character equipped with a movable element that is always in readiness to seek its locking position, while being so mounted as to be disengaged with slight effort yet free from likelihood of casual displacement.

With these and other objects in view, this invention resides in the novel features of construction, formation, combination and arrangement of parts to be hereinafter more fully described, claimed and illustrated in the accompanying drawing, in which:—

Figure 1:
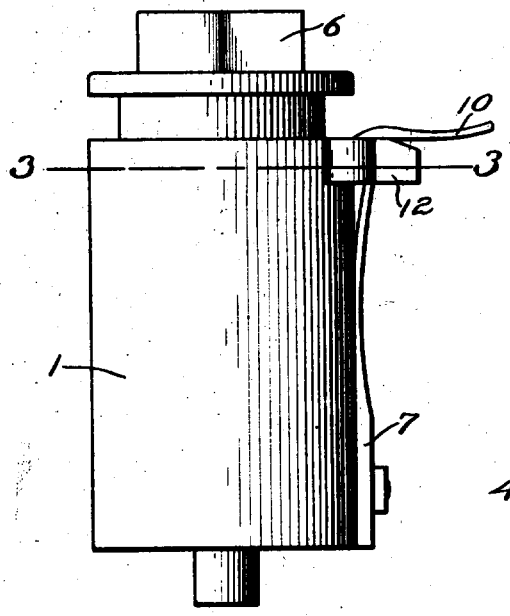
Figure 1 is a side elevation of the device.
Figure 2:
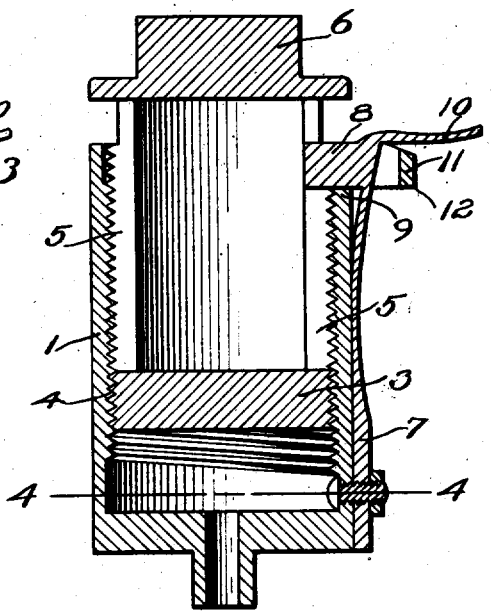
Fig. 2 is a vertical central sectional view through the device.
Figure 3:
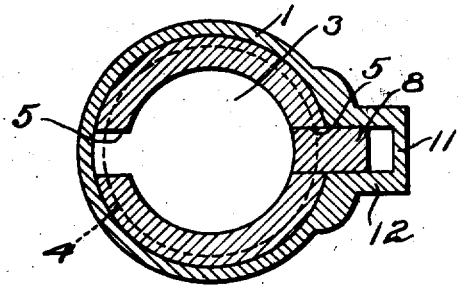
Fig. 3 is a sectional view on line 3—3 of Fig. 1.
Figure 4:
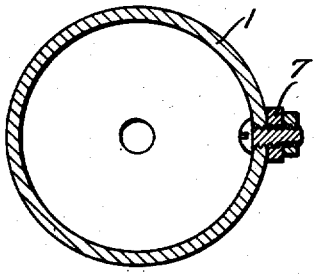
Fig. 4 is a similar view on line 4—4 of Fig. 2.

In the present instance the lock is shown as used in connection with a grease cup, and in which 1 indicates the cup, which is cylindrical and has its bottom provided with a nipple 2, and through which the grease is discharged.

The plunger 3 is hollow and exteriorly threaded, as at 4. The plunger 3 is further provided with longitudinal slots 5, two of which being illustrated in the drawing, but it will be of course understood that the number may be varied as desired. The upper end of the plunger is provided with a squared head 6, which is adapted to be engaged by a wrench, or other suitable tool, whereby the plunger may be rotated. The plunger is exteriorly threaded so as to engage the threads formed interiorly of the cup 1.

Bolted to the cup 1 is the lower end of a steel arm 7, the upper end of which is provided with a head 8 which occupies the notch 9 formed in the upper edge of the cup, said head being adapted to engage either one of the slots 5, formed in the plunger so as to prevent rotation thereof. The head 8 is provided with a finger piece 10 which overhangs the horizontal bar 11 of the bracket 12, said bracket being connected to the cup, and constituting a hand hold or rest for use in moving said head back out of operative position. This bracket 12 with its bar 11 serves as a guide and support for the head 8 in its movement and provides a backing to hold this head correctly alined.

When it is desired to adjust the plunger, it is only necessary to place the forefinger under the bracket 12, and the thumb upon the finger-piece 10, whereupon the arm 7 may be flexed outwardly until the head 8 thereof is withdrawn from the selected slot 5. After this is done it is obvious that the plunger may be rotated, as desired. To replace the plunger in the cup, it is only necessary to press the lower end thereof in engagement with the head 8, thus forcing the same outwardly, and since the slots 5 do not extend the entire length of the plunger, the uninterrupted threaded portion of the plunger will engage the interior threads of the cup, which start at a point slightly below the upper edge of the cup. I am aware that the invention may be embodied in other specific forms without departing from the spirit or essential attributes thereof, and I therefore desire the present embodiment to be considered in all respects as illustrative and not restrictive, reference being had to the appended claims rather than to the foregoing description to indicate the scope of the invention.

Having described my invention, what I claim as new and desire to secure by Letters Patent is:

1. A device of the kind described, comprising a cup interiorly threaded, a plunger exteriorly threaded for engagement in the cup, said plunger having a longitudinal slot formed therein, a spring arm having one end fixed exteriorly to the side of the cup adjacent the bottom thereof and its other free end provided with a head adapted to engage said slot, said head bearing a finger piece and means carried by the cup adjacent said finger piece to constitute a hand hold in grasping said head for actuation thereof.

2. A device of the kind described, comprising a cup interiorly threaded, a plunger exteriorly threaded for operation therein, said plunger having a longitudinal slot formed therein, a spring arm having its lower end fixed exteriorly of the cup and its upper end provided with a head adapted to engage said slot, a finger piece carried by the head, and means mounted on the cup and adapted to be grasped with the finger piece to disengage the head from said slot, said means constituting also a guide and support for said head.

3. A device of the class described, comprising a cup interiorly threaded, a plunger exteriorly threaded for threaded engagement in the cup, said plunger having a plurality of longitudinal slots formed therein, a steel arm having its lower end fixed exteriorly of the cup, and its upper end provided with a head adapted to engage a selected slot, a finger piece carried by the head, and a bracket carried by the cup and adapted to be grasped with the finger piece to disengage the head from a selected slot.

BURTON M. KENT.